No. 645,717. Patented Mar. 20, 1900.
E. J. FLETCHER.
ABRADING MACHINE.
(Application filed Sept. 20, 1898.)
(No Model.)
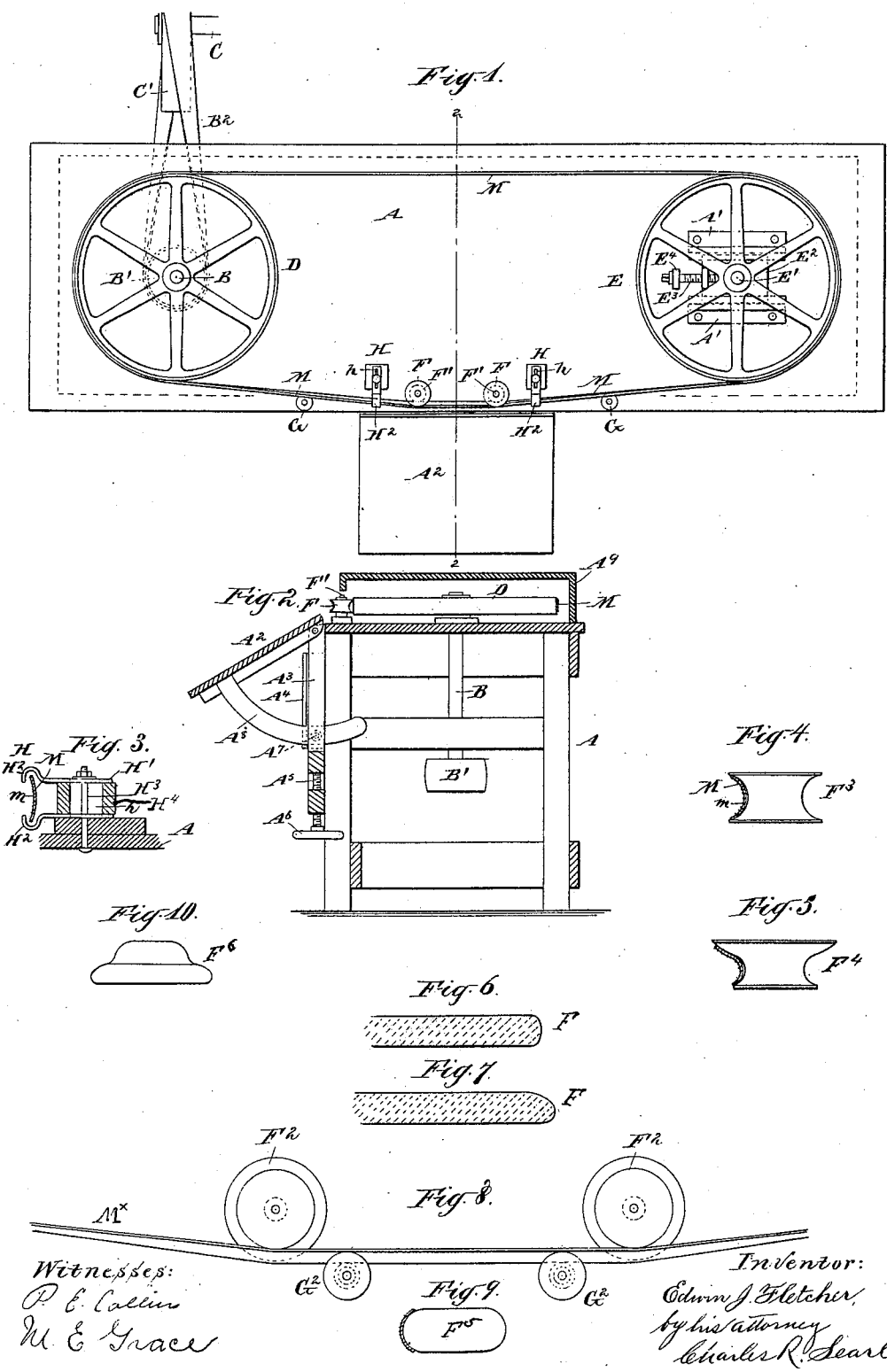
Witnesses:
P. E. Collins
M. E. Grace
Inventor:
Edwin J. Fletcher,
by his attorney
Charles R. Searle.

UNITED STATES PATENT OFFICE.

EDWIN J. FLETCHER, OF NEW YORK, N. Y., ASSIGNOR TO THE PATENT CASE COMPANY, OF SAME PLACE.

ABRADING-MACHINE.

SPECIFICATION forming part of Letters Patent No. 645,717, dated March 20, 1900.

Application filed September 20, 1898. Serial No. 691,417. (No model.)

*To all whom it may concern:*

Be it known that I, EDWIN J. FLETCHER, a citizen of the United States, residing in New York city, in the county and State of New York, have invented a certain new and useful Improvement in Abrading-Machines, of which the following is a specification.

The invention relates to that class in which an endless belt or band surfaced with abrading material is rapidly traversed and the articles to be treated are presented in contact therewith.

The object of this improvement is to provide means whereby the band may be forced to assume a curved cross-section in that portion of its travel in which the work is performed, so that a curved abrading-surface will be presented to serve in treating correspondingly-shaped articles.

The invention consists in a continuous belt or band coated on one face with the abradant and so conditioned as to be flexible and yielding, driven by rapidly-revolving pulleys and provided with a shaping-surface in contact with the inner uncoated face, adapted to force the band to the required form in cross-section. In practice I prefer to make such shaping-surface in the form of two rollers separated a little distance from each other and having the required curved peripheries, mounted within the band and straining the latter outwardly, so that it will assume the same or approximately the same curve in traversing the interval between the rollers. Means are provided for further guiding the band and for conveniently and accurately presenting the work to be treated.

The invention also consists in certain novel details of construction and arrangements of parts to be hereinafter described, and pointed out in the claims.

The accompanying drawings form a part of this specification and show the invention as I have carried it out.

Figure 1 is a general plan view with certain portions of the casing removed to better show the parts within. Fig. 2 is a corresponding transverse section on the line 2 2 in Fig. 1. The remaining figures are on a larger scale. Fig. 3 is a transverse section through a portion, showing the guides. Figs. 4 and 5 are elevations showing two forms of rolls and the shape assumed by the band in passing them. Figs. 6 and 7 show the edges of pieces of work treated by the rollers shown in the preceding figures. Fig. 8 is a plan view showing a modification. Figs. 9 and 10 show forms of rollers in which the abrading-face of the band is forced to a convex form.

Similar letters of reference indicate the same parts in all the figures.

A is a frame or table having at one end a vertical spindle B, supported in suitable bearings and rotated by a belt $B^2$, running on a pulley B' from a pulley C' on a horizontal shaft C, driven by power from any convenient source. The upper end of the spindle B carries a large horizontal pulley D fixed thereon, and at the opposite end of the table is a similar pulley E, mounted on a stud E', with liberty to revolve freely.

M is an endless belt or band of webbing coated on one face, $m$, with sand, emery, or other abradant of the desired fineness embedded in glue in the manner common in sandpaper manufacture and, so far as yet described, having the harsh unyielding qualities of that product. To impart the necessary flexibility required for the purposes of this invention, I treat the belt with saccharine solution, preferably ordinary glycerin applied to the uncoated surface, which, striking through, softens the glue, but without loosening the particles of the abradant. The glycerin or other matter may, however, be added to the glue before the abrading material is applied. In both cases the desired softening effect will be attained. The band thus treated should be of a length sufficient to form a belt running tightly upon the pulleys D E, and in order to take up any slackness from atmospheric or other causes the stud E' is preferably mounted on a slide $E^2$, carried in ways A' on the table and adjusted longitudinally of the latter by a screw $E^3$, held against advance by the collar $E^4$.

At about the mid-length of the table and within the band are two concave rollers F F, horizontally mounted with liberty to revolve on vertical pins F' F', set in the upper face of the table and preferably a little without the natural line of travel of the band, so that the latter will be strained outwardly. The rollers F F are situated a short distance apart, and the strained band in passing takes the shape of the groove or concave and maintains it approximately while traversing the intervening space. Any article presented thereto and held in contact therewith will be shaped by the rapidly-running abrading-face to the same or approximately the same curve.

$A^2$ is a shelf or table mounted in a frame $A^3$, supported in vertical ways $A^4$ on the main frame A and adjustable vertically by a screw $A^5$ and hand-wheel $A^6$, as will be understood. The shelf $A^2$ is so set for working that its upper edge projects slightly above the edge of the table A in front of the rollers F F and offers a convenient support for the articles to be treated. The shelf is hinged to the frame $A^3$ at the top, and its angle may be varied as required by slackening the screws $A^7$, impinging against the sides of the segmental arms $A^8$, as shown, and elevating or depressing the free edge of the shelf until the desired inclination is attained, and again tightening the screws $A^7$.

H H are guides consisting of pairs of strips $H'$ of metal bent at one end, as shown, to form hooks $H^2$, partly inclosing the upper and lower edges of the band and adjustable transversely to the motion of the latter by bolts $H^3$, extending through slots $h$, cut in the strips and their separating-blocks $H^4$, into the table A. They are placed close to the rollers F and serve in maintaining the band in position upon the rollers and preventing its accidental displacement when the work is thrust against it.

The pulleys and band are preferably inclosed by a removable cover $A^9$, cut away in the vicinity of the rollers to allow access to the band along the upper edge of the shelf $A^2$.

The invention is intended more particularly for shaping the edges and adjacent margins of tablets or thick sheets of bookboard or like material in the manufacture of cases or boxes for silverware and other expensive goods. Great difficulty has been experienced in finding a means for successfully and rapidly rounding the edges of such sheets, and many cutting, grinding, and other appliances have been unsuccessfully tried. By the means herein set forth this work may be accomplished easily, expeditiously, and uniformly, the latter being a quality of first importance in such manufacture.

G G are idle rollers mounted outside the band between the rollers F and pulleys D E and running in frictional contact with the abrading-surface of the band. Their peripheral faces are rounded, and they serve to initiate and maintain the curved condition of the band in approaching and leaving the rollers F. Such rollers are not deemed generally necessary or desirable; but in producing certain curves they may be employed to advantage. These rollers are preferably of wood and when worn are replaced with others.

Modifications may be made in the arrangements of parts and details of construction within wide limits without departing from the principle of the invention. The band $M^×$ may be made by attaching strips of sandpaper to an endless belt, care being taken to abut the ends at the joints to avoid thickening and afterward imparting the required flexibility by the application of glycerin or similar material. The guides H may be omitted, depending upon the concavity of the rollers alone in guiding the band.

Fig. 8 shows an arrangement adapted to produce or finish the surface of a piece of work having a grooved or hollowed face. In this form I place a hollowed idle roller $G^2$ in contact with the abrading-face of the band near the rollers $F^2$ and between the latter to assist in maintaining the band against the tendency to flatten at this point. These and the rollers G, as before stated, are not essential, but are inexpensive and may be used when desired.

The shapes of the rollers may be varied indefinitely. In Figs. 4, 5, 9, and 10 are shown several differing contours and lettered $F^3$, $F^4$, $F^5$, and $F^6$, respectively. The sizes and proportions are unimportant, and the materials employed in mounting and operating the band and the abradant used may be varied.

Although I have described the band as of webbing, any suitable fabric or other material may be substituted, and the glue may be any cement capable of fulfilling the conditions of holding the particles of the abradant and being softened by the glycerin or other saccharine matter.

The band may serve in polishing or buffing operations, the coating being of suitable material for such work.

Instead of the rollers shown pins or blocks properly shaped may be substituted therefor and will serve successfully; but the friction induced renders such not generally desirable.

I claim—

1. The table A, pulleys D, E, and band M running thereon, in combination with the shaping-rollers F arranged within the band to strain the latter outwardly and cause it to assume a corresponding cross-sectional form, and the guides H arranged with said rollers between them, said guides being adjustable to and from the band to maintain the band in position and means acting on the opposite face of the belt independent of said rollers and guides, all substantially as herein specified.

2. The table A, pulleys D, E, and band M running thereon and having the face $m$ coated with an abradant, in combination with the curved shaping-rollers F arranged within the band in contact with the latter on the uncoated face, and the rollers G running in contact with the coated face and the adjustable guides disposed between said shaping-rollers and the rollers, all substantially as herein specified.

3. The table A, pulleys D, E, and abradant band M running thereon, in combination with the shaping-rollers F arranged within the band to strain the latter outwardly, and the pivotally-mounted vertically-adjustable shelf $A^2$ arranged with its upper end extending slightly above the upper face of the table in proximity to said rollers and means independent of the pivot of the upper end of the shelf for varying the angularity of said shelf relatively to said table and band, all substantially as herein specified.

4. The table A, pulleys D, E, and abradant band M running thereon, in combination with the shaping-rollers F arranged within the band to strain the latter outwardly, the pivotally-mounted vertically-arranged shelf $A^2$ arranged with its upper end extending slightly above the upper face of the table in proximity to said rollers and its adjusting means $A^5$, $A^6$, the segmental arms $A^8$ and fastening means $A^7$ for adjusting the angle of said shelf relatively to said table, all substantially as herein specified.

5. The combination with the table and the pulleys and endless belt, of a guide consisting of a pair of strips bent at one end to form hooks to inclose the edges of the belt, a spacing-block between said strips and provided with a slot, and a bolt extended through said slot and into the table, substantially as shown and described.

In testimony that I claim the invention above set forth I affix my signature in presence of two witnesses.

EDWIN J. FLETCHER.

Witnesses:
WM. B. JAMES,
CHARLES R. SEARLE.